Figure 1:
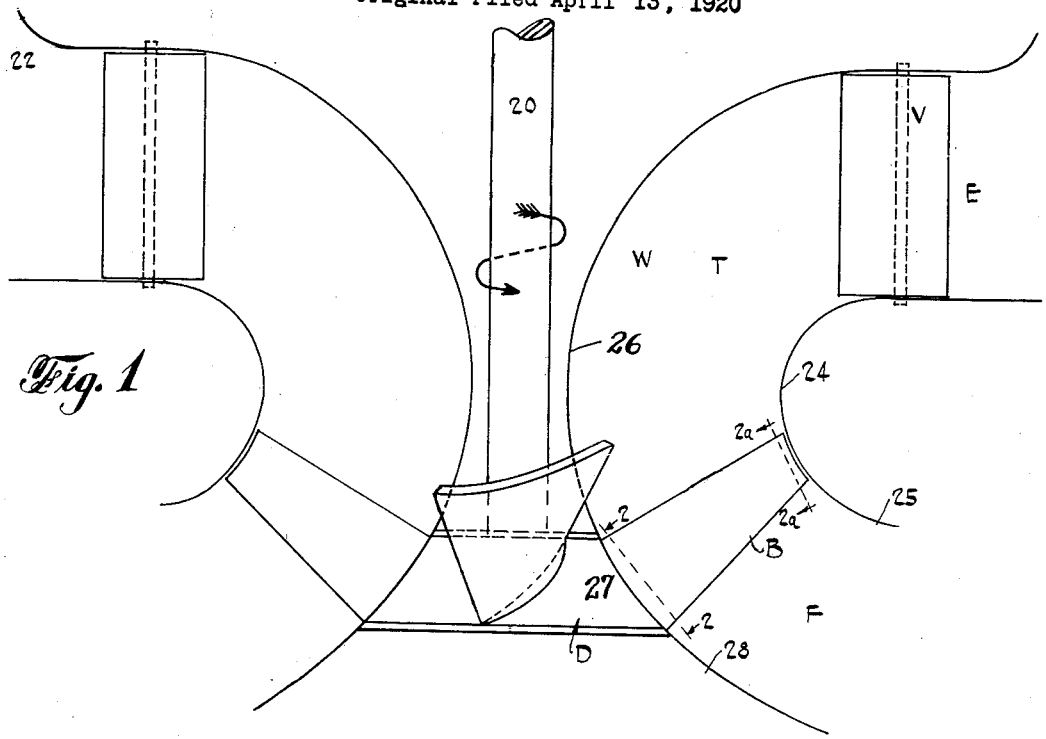

Oct. 3, 1933.  L. F. MOODY  1,929,100

HYDRAULIC TURBINE

Original Filed April 13, 1920

INVENTOR
Lewis F. Moody
BY
ATTORNEY

Patented Oct. 3, 1933

1,929,100

UNITED STATES PATENT OFFICE 1,929,100

HYDRAULIC TURBINE

Lewis Ferry Moody, Philadelphia, Pa., assignor, by mesne assignments, to I. P. Morris and De La Vergne, Incorporated, a corporation of Delaware Original application April 13, 1920, Serial No. 373,545. Divided and this application August 16, 1929. Serial No. 386,416

1 Claim. (Cl. 253—122)

This invention relates to hydraulic turbines and more particularly to a high specific speed turbine having a runner of a relatively small number of blades which is sometimes known as a propeller type runner.

One object of the invention is to provide a turbine in which the water passages and runner cooperate together to attain high specific speed with high efficiency for every part of the water stream.

A further object of the invention is to provide a water passage adapted to turn the water flow from an inward to an outward direction without the formation of eddies and particularly to provide a novel relation of the position of the runner with respect to its water passage whereby an outward flow runner is had.

A further object of the invention is to combine with my improved passage arrangement an outward flow runner of simple blade formation operating in the stream within said passage at high relative velocity between the blades and water without causing eddies or high friction losses.

Another and more specific object of the invention is to provide an outward flow runner having diagonal blades with respect to a plane normal to the runner axis, and to have the surfaces of the blades formed by substantially straight line elements which are directed generally toward the runner axis, and which in the preferred specific embodiment of the invention, lie in or substantially close to meridian planes.

With runners of relatively high rotational speed it is particularly important to avoid eddies and disturbances of the flow and to maintain smooth conditions of flow without sudden changes of curvature of path or of direction or magnitude of velocity, and it is especially important to simplify and smooth out the flow lines and surfaces at the turbine runner where any irregularities are particularly liable to be harmful. In order to keep as small as possible the losses in the water passing through a high speed runner it is desirable that, while maintaining the proper action of the water on the runner blades, the curvature of the blades and the amount of exposed surface should be reduced. While some attempts in this direction have been made, so far as I am aware no definite design has hitherto been evolved securing these results or giving the proper relation between the factors controlling the blade shape and angle. The embodiment of my invention disclosed herein is one of the several arrangements resulting from the theory set forth in my copending application Serial No. 373,545, filed April 13, 1920 of which this specification is a division.

Figure 2:
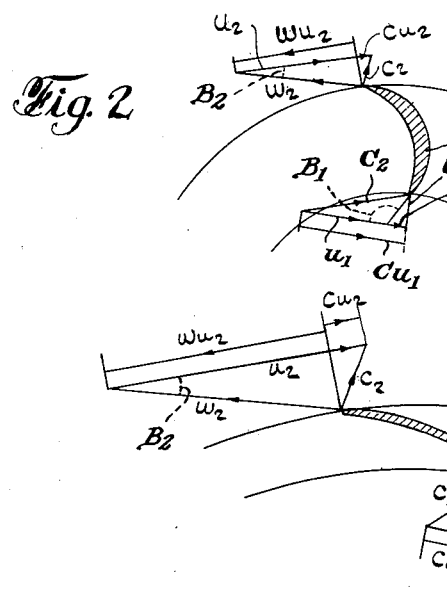

Not only will further objects and advantages of my invention be seen, but also the manner of carrying out my invention will appear from the following description of the accompanying drawing in which:

Fig. 1 is a vertical diagrammatic section, and Figs. 2 and 2—A are conical sections of the blades taken respectively on lines 2—2 and 2A—2A of Fig. 1, with velocity triangles, illustrating the relation of the surface contours to the flow.

In the embodiment of the invention in Fig. 1 the turbine shown is of the vertical shaft type and its waterway contains a water passage W smoothly and continuously curving in the same direction from the radially directed entrance E through transition space T and to the discharge or flow decelerating draft tube F without any sudden changes in direction or velocity at any points. For simplicity, the entrance is of the radial inflow or Francis type and is provided with the usual and well known type of inflow guide vanes or wicket gates V which may be fixed or adjustable about their vertical axis, or both types may be used, and if adjustable, they are actuated by any usual gate operating mechanism. These vanes are normally set at an inclined position so as to give the entering water a whirl around the axis 20 of the runner. The flow from the head water to the entrance space E may be by any convenient intake such as a contracting volute passage diagrammatically indicated at 22. The outer wall 24 of the passage W curves smoothly from the entrance E to the axial direction at the center and then continues this curvature back toward the radial direction to merge into the outer wall 25 of the conical expanding draft tube F.

The flow is thus guided first inwardly and then axially and then outwardly in smooth lines of continuously varying curvature, the curvature being at first small, approaching a maximum near the throat or point nearest the axis and then gradually decreasing to the outlet. This continuously curving wall thus avoids the sudden sharp curvature and subsequent straight line design and sometimes the use of reverse curves which has hitherto been characteristic practice in turbines having inward flow guide vanes. The preserving of a gradual change of curvatures is particularly important with turbines of high specific speed in which high velocities of flow are used. The transition space T ensures that the flow will pass to the runner along smooth flow lines and as a solid body of water for the reason that the transition space by being vane-free will permit the various divided streams of flow passing through the guide vanes V to consolidate into a single whirling mass of water. This is particularly desirable in a high specific speed propeller type turbine, as it eliminates unnecessary vibration, pitting of the runner or other serious effects, thus making it possible to obtain effectively the desired high speed.

The inner wall 26 of the water passage W curves smoothly from the radial toward the axial merging with the runner crown 27 and being resumed by the surfaces of the central cone 28 formed in the inner surfaces of the expanding draft tube F from which the outflow may be collected and passed to the tailwater. The inner wall would be spaced from the outer wall so as to give the proper area corresponding to the desired velocity at each point of the passage, and due to the nearness of the inner wall to the axis its central portion may be of nearly constant curvature or have points of higher curvature above and below the throat, but as in the outer wall the curvature will be continuously varying throughout.

Due to the whirl at the entrance caused by the entrance guide vanes the flow lines through this passage W are spirals first contracting and then expanding. Such a water passage maintains smooth conditions of flow and avoids any sudden change in the distribution of velocities and the consequent formation of eddies, and is consistent with minimum overall dimensions of the turbine. The radial inward direction of the flow is well adapted to advantageous methods of regulation as by the adjustable guide vanes V in the entrance space. If successive cross sections of the passage W are taken, each section being taken along a conical surface coaxial with the runner and extending transversely across the flow that is substantially at right angles to the central flow lines, the areas of these cross sections near the entrance space E will be greater than the cross sectional areas near the runner, that is, these cross sectional areas will progressively decrease from the entrance space E to the runner and beyond the runner these cross-sections or areas then gradually increase from the discharge end of the runner to the final outlet of the passage; thus in its lower portion providing a draft tube F radially expanding and simultaneously increasing in cross-section so as to efficiently regain both the whirling and meridian components of velocity, a meridian component being that component taken in a plane containing the runner axis.

This outward flow passage at discharge provides an efficient diffuser in which the energy of whirl components of flow can be efficiently regained within a limited space; and such a passage enables the overall dimensions of the turbine to be kept a minimum and the whole structure made very compact. A radial outward flow passage is efficient for regaining the velocity head of whirl for the reason that although the radial extent of such a passage may be limited, the actual distance traversed by the whirling elements of the stream is much greater than the length of the passage measured in the cross-section containing the axis, since the actual paths of the stream elements are gradually expanding spirals. Consequently in such a passage the absolute velocity of flow may be reduced at a sufficiently gradual rate to provide high efficiency of conversion of velocity head into pressure head. The turbine of this invention is designed for a comparatively high velocity of whirl during the passage of the water through the runner and its reduction in the runner is moderate in comparison with the whirl at entrance to the runner, so that a very considerable amount of whirl still remains at the runner discharge.

This continuously curving vortex form of water passage W thus permits of the efficient use of high components of whirl throughout and such a whirling stream curving gradually in a meridian plane is especially adapted in the installation of this invention to cooperate with a simple form of runner to attain a high specific speed and smooth and efficient conditions of flow.

The runner D is disposed so that the water or flow passes in an outward direction through the runner, the surfaces of the runner blades B being formed in accordance with the theory set forth in my above mentioned copending application so that the runner efficiently cooperates with the outflowing stream and as a result the blade surfaces and the entrance and discharge edges cut across the flow on the shortest possible lines and produce a simple form of surface avoiding sharp and complicated curvature and resultant eddy losses, and maintaining an efficient contact with the stream at all points to maintain a sufficient cooperation with the flow. It is seen that the runner near its periphery is concave on its driving face and convex on its back side as shown in Fig. 2—A, while adjacent the hub similar curvatures are present as shown in Fig. 2. The blade surfaces in between the periphery and the hub will be dictated in accordance with the substantially straight line elements extending between corresponding points at the periphery and hub so that a surface will be provided which gradually changes from the formation shown at the periphery to that at the hub, and yet the surfaces will be formed of substantially straight line elements. In Fig. 1 the peripheral edges of the two blades in side elevation are shown in circular projection making it appear that the edges have appreciable concavity, although it will, of course, be understood that in plan view the edges will have convexity so as to conform to the outer wall 25 which is formed as a surface of revolution.

It should be borne in mind that the turbine of this invention is particularly adapted to the production of high specific speeds. The water passages and runner mutually contribute and combine together to maintain the efficiency and smooth flow. In the design of the meridian section of the water passage in which the runner operates it is of importance to avoid curves of small radius and rapid changes in curvature, the variation of the curvatures of both walls of the passage W being gradual and continuous throughout. The use of walls of gradually varying curvature in the meridian section is of importance in the turbine of high specific speed for the reason that not only are high velocities of whirl employed but high meridian components of velocity are also used.

The turning of the stream in the meridian plane involves a whirling of the water particles in this plane, which is perpendicular to the plane of the whirl previously referred to, and which takes place around the turbine axis, that is, in planes perpendicular to the axis. The whirl in the meridian plane may be called a secondary whirl. It results in the setting up of centrifugal pressures increasing from the outer wall toward the turbine axis, and in an accompanying variation of meridian velocities, these velocities being highest near the outer wall and lowest near the axis. This variation is due to the centrifugal force of the secondary whirl which increases the pressures near the turbine axis and correspondingly decreases the meridian velocity components. In the design of the runner of this invention, due account is taken of this variation of meridian velocities; and all harmful effect of the secondary whirl is avoided. If, however, there were sudden variations in curvature of the meridian section of the passage, there would be sudden unavoidable changes in the centrifugal pressures and in the distribution of meridian velocities, conditions which lead to the refusal of the water to follow the contour of the walls, and to the formation of eddies and wasteful disturbances.

Figure 2A:
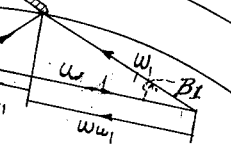

The velocity relations of the surface contours to the flow at different points in the passage W are illustrated in the velocity triangles in Figs. 2 and 2A wherein—

$c_1$ denotes the absolute velocity of the water at entrance into the runner.

$c_2$ denotes the absolute velocity of the water at exit from the runner.

$w_1$ denotes the relative velocity of the water at entrance into the runner.

$w_2$ denotes the relative velocity of the water at exit from the runner.

$c_{u1}$ denotes the absolute velocity of whirl of the water at entrance.

$c_{u2}$ denotes the absolute velocity of whirl of the water at exit.

$w_{u1}$ denotes the relative velocity of whirl of the water at entrance.

$w_{u2}$ denotes the relative velocity of whirl of the water at exit.

$u_1$ denotes the relative velocity of the runner at entrance.

$u_2$ denotes the relative velocity of the runner at exit.

In a runner of the outward diagonal flow type such as shown herein considering the flow on conical sections as shown developed in Figs. 2 and 2A we have $u_1 c_{u1} - u_2 c_{u2} = gHe$ in which H is the effective head on the turbine, $e$ is the hydraulic efficiency of the turbine and $g$ is the acceleration of gravity. Since $gHe$ is a positive quantity the product $u_1 c_{u1}$ must be greater than $u_2 c_{u2}$; and since in an outward-flow runner $u_2$ is greater than $u_1$, $c_{u1}$ must be greater than $c_{u2}$ and consequently $w_{u2} = u_2 - c_{u2}$ must be greater than $w_{u1} = u_1 - c_{u1}$; (because $u_2 > u_1$ and $c_{u2} < c_{u1}$). Hence, in such a runner, $\beta_1$ is greater than $\beta_2$ and the vane must be concave when viewed from the face side.

Summarizing the operation of the turbine of this invention the water enters in entrance space E between guide vanes V in streams progressing inward with a tangential whirl. The walls of the water passage W begin a gradual turning of this whirling flow toward the axial direction and provide a free transition space T between the entrance and the runner wherein the flow lines without obstruction collect into a single whirling mass. The gradual turning in a meridian plane of this rapidly whirling flow is continued throughout the water passage W on lines of slowly changing curvature. Due to the high speed of rotation the combination of this invention involves comparatively light torque on the runner blades so that the whirling flow passes down through the runner which rotates rapidly with respect to the stream which is itself rotating. The runner blades glide through the stream with little disturbance and cause only a moderate change in velocity of the flow, which as it leaves the runner still is whirling with considerable velocity. Beyond the runner the water passage W continues the same smooth lines of gradually changing curvature and this curvature at the runner is continuous with that at the entrance end of the draft tube F, the curvature then gradually decreasing toward the discharge end of the tube. The whirling outflow from the runner therefore is consolidated in the free transition space below the runner again forming a smoothly whirling mass which is then gradually decelerated as it passes to the outlet, the particles flowing along naturally expanding spiral lines.

Runners of high specific speed have heretofore been developed largely by the experimental or cut-and-try method, and the absence of an adequate general theory has not permitted such runners to be intelligently altered to any material extent without introducing uncertainties as to the performance to be expected. For example, there has not heretofore been disclosed any general method or design of such axial flow runners of high specific speed by which the design may be altered to give lower or higher speed, or by which the type may be changed from purely axial to a greater or lesser degree of inward or outward flow.

In the turbine of this invention these uncertainties are overcome in avoiding the complicated shape of runner blading which has been used in the prior art turbines such as the Francis type, and which not only permitted this type of turbine to obtain its highest specific speed but also eliminated the sources of uncertainty in regard to the fluid friction losses in the runner. In particular some of the causes of uncertainty which are avoided in this invention are the "spoon shaped" curvature of the runner vanes which has heretofore been common, that is, the pronounced curvature of the meridian sections of the runner vanes; also the decided curvature which has been given to the sections of the runner vanes taken in the direction of flow, that is, in conical sections with the elements of the cone extending in the general direction of flow; the use of a runner band or shroud ring introducing a surface having high relative velocity with respect to the water; and in addition the employment of sudden changes of curvature in the water passage has been abandoned.

In the runner of this invention all of the vane sections can be made with only slight curvature in the direction of flow so that the passages between the vanes will be substantially straight. By this means the uncertainties due to lack of knowledge of losses in elbows can be avoided and the loss due to curvature in the passage can itself be eliminated. Moreover, the avoidance of the necessity for deflecting the water through large angles permits the lengths of the vanes to be reduced and their spacing increased, thus reducing the area of the exposed surface. The passages between the runner vanes are, therefore, in the turbine of this invention reduced to short sections of straight conduits for which the fluid losses can be calculated. The blades of the runners are so formed and spaced that open spaces are left between at least the outer portions of the blades as would be seen in a plan view. At their inner portions the blades are nearer together and overlap, that is, a line at right angles to the lines of flow and extending from the edge of one blade will intersect the adjacent blade.

It will of course be understood that various modifications and changes in details of construction may be employed without departing from the spirit of the invention as set forth in the appended claim.

This application is a division of my copending application filed April 13, 1920, Serial No. 373,545 and is directed to the digonal outward flow type of turbine.

I claim:

The combination in a hydraulic turbine comprising means forming a passage having inner and outer walls continuously curving from a radially inward direction to a diagonally outward direction at discharge, the center of curvature of the wall profiles remaining substantially at all points on the same side of the walls of said passage, a high specific speed propeller type runner having a relatively small number of unshrouded blades inclined with respect to the runner axis in an upwardly extending direction, said blades being disposed within the outward flow portion of said passage and being in points adjacent their periphery of relatively low pitch and relatively flat in the direction of fluid flow thereover, and said runner having a hub which tapers outwardly in the direction of flow to form an element of said inner wall, and guide vanes disposed in said passage in the inward flow portions thereof, said guide vanes being spaced from said runner to provide a transition space therebetween.

LEWIS FERRY MOODY.